Patented Mar. 16, 1954

2,672,397

UNITED STATES PATENT OFFICE 2,672,397

REACTION OF WOOL WITH BETA-PROPIO-LACTONE AND WATER

Harold P. Lundgren and William Gordon Rose, Berkeley, Calif., and Harrison Walter Jones, Los Alamos, N. Mex., assignors to the United States of America as represented by the Secretary of Agriculture No Drawing. Application August 22, 1952, Serial No. 305,931

3 Claims. (Cl. 8—112)

(Granted under Title 35, U. S. Code (1952), sec. 266)

A non-exclusive, irrevocable, royalty-free license in the invention herein described, for all governmental purposes, throughout the world, with the power to grant sublicenses for such purposes is granted to the Government of the United States of America.

This invention relates to the chemical modification of wool by reaction thereof with beta-propiolactone and water.

It has been shown by Lundgren and Jones (U. S. Patent No. 2,517,573) that wool reacts with beta-propiolactone under anhydrous conditions to produce a chemically modified wool which has many advantages over the untreated wool, particularly, the modified wool forms felts of greater tensile strength than those produced from the natural wool. Further, the modified wool forms a felt more rapidly than does the natural wool.

It has now been found that the reaction between wool and beta-propiolactone is greatly accelerated by the presence of water. Our procedure of chemically modifying wool by reacting it with beta-propiolactone and water has significant advantages over the known anhydrous technique because with an equal time of reaction a greater proportion of beta-propiolactone can be combined with the wool and hence a greater degree of chemical modification obtained or a similar proportion of beta-propiolactone can be combined with the wool in a shorter period of time than under anhydrous conditions.

Our experiments on the effect of water on the reaction of wool with beta-propiolactone have demonstrated the following: Under absolute anhydrous conditions the reaction is very slow, there being no measurable uptake of the lactone even after days of contact between the reactants. However, if to a series of reaction mixtures, water is added in small increments up to about 10%, it has been observed that there is little if any increase in the rate of reaction. Above 10% water the reaction rate starts to increase rapidly and reaches a maximum at about 25% water. With further increments of water, the reaction rate remains essentially constant to about 100-200% water. With further increments of water there is a slight decline although even with 500% of water the reaction rate is only about 10-15% less than the maximum rate. In this paragraph and throughout the instant specification and claims the percentage of water is based on the weight of dry wool.

In conducting the process in accordance with this invention, a part of the water which enhances the reaction may be that naturally present in the wool since wool in contact with air always contains anywhere from 8–15% moisture depending on the relative humidity of place where it is kept. Additional water, as such, may be added to the reaction mixture to supply the necessary proportion thereof. Since the natural moisture in the wool does not do any harm but adds to the total proportion of water available in the reaction, it is not necessary to dry the wool prior to the reaction. Thus the wool as ordinarily stored in the open can be used directly in the process. Usually in practicing this invention it is desirable to add enough extra water to the reaction system so that the total amount of water (that in the wool and that added as such) is at least about 25% thus to ensure maximum rate of reaction. If desired, the proportion of water can be greatly increased above this level since as explained above excessive amounts of water are not detrimental. Another point is that the water need not necessarily be present in the reaction mixture as such in an uncombined state. Thus it has been observed that the reaction rate is enhanced even if the water is first mixed with the beta-propiolactone and allowed to react therewith whereby at least part of the water reacts with the lactone to produce beta-propionic acid and other hydrolytic products. In such case, the reaction is carried out with part of the water present in an uncombined state and part of it combined with the beta-propiolactone and thus present in the reaction mixture as the resulting beta-propiolactone hydrolysis products. This type of partial pre-hydrolysis of the lactone is shown in Examples I and III herein. It is also to be realized that even if the water is present wholly as such at the initiation of the reaction, a certain amount of hydrolysis of the beta-propiolactone will occur during the reaction. From this analysis of the situation it will be evident that when reference is made to a particular proportion of water in the reaction of wool with beta-propiolactone it is to be understood that this amount of water may be wholly uncombined or may be at least in part reacted with the beta-propiolactone whereby it is present in the reaction mixture in a combined form in the beta-propiolactone hydrolysis products.

We have not been able to ascertain the reason for the effect of water on the reaction in question. One possibility is that the water acts as a catalyst or that the beta-propionic acid which is formed by hydrolysis acts as a catalyst. Another possibility is that the water tends to swell the wool fibers so that the wool presents a greater surface available for reaction with the beta-propiolactone. Regardless of the theory involved we have found by actual experiment that water does enhance the chemical combination of wool and beta-propiolactone.

The fact that the presence of water would enhance the combination of wool and propiolactone is entirely surprising and unexpected. It would be only logical to assume that water would be detrimental because it is well known that beta-propiolactone is very easily hydrolyzed to beta-propionic acid. It would be expected therefore that if water were present the primary reaction would be that involving hydrolysis of beta-propiolactone to beta-propionic acid rather than the combination of the beta-propiolactone with the wool.

In carrying out the process of this invention, the proportion of beta-propiolactone to wool can be varied depending on the degree of chemical modification desired. To obtain a high degree of modification the proportion of reactants should be at least 1 part of beta-propiolactone per part of wool (dry basis). Generally a greater proportion of beta-propiolactone, about 10 parts of the lactone per part of wool (dry basis), is used to ensure complete reaction. The unreacted portion of the lactone can easily be recovered from the reaction mixture and re-used. It is convenient to use such or a larger excess of the lactone so that the wool can be immersed in it while the reaction is allowed to take place. In most cases it is desirable to employ the beta-propiolactone in solution form thus to increase the volume of this liquid reactant so that the wool can be completely immersed in the liquid reagent and to ensure better contact with the wool and penetration into the wool fibers. Any inert organic solvent for the beta-propiolactone can be used, for example, methanol, ethanol, propanol, isopropanol, any of the isomeric butanols, chloroform, carbon tetrachloride, ethylene dichloride, chloroform, ether, benzene, acetone, hexane, petroleum ether, Stoddard solvent, gasoline, and so forth. Usually as a matter of convenience, the reaction is conducted at room temperature. However, the temperature may be varied from about 0° to 100° C., the rate of reaction increasing with increase in temperature. In most cases it is preferable to use a temperature below about 40° C. to avoid possibility of damage to the wool fibers. The time of reaction depends on many factors such as percentage of water, temperature, and to a lesser extent on the proportion of lactone and the type of wool being processed. In general, it is preferred to allow the reaction to continue until the wool has taken up about 30 to about 70% beta-propiolactone, based on the weight of dry wool. Chemically modified fibers of this type possess the optimum properties for felting. Thus, wool containing about 30 to about 70% of chemically reacted beta-propiolactone forms felts having at least twice the tensile strength as compared with felts produced from natural wool. For other purposes, the time of reaction, or other conditions, may be adjusted to obtain a lesser or greater degree of chemical modification.

Instead of applying the beta-propiolactone in the liquid phase it may be applied to the wool in the vapor phase. In applying this modification of the invention, the wool may be placed in a vessel where it is subjected to vapors of beta-propiolactone. The water required to enhance the rate of reaction may also be in the liquid or vapor state and may be all incorporated with the wool, with the beta-propiolactone or part in both. Since the lactone is a high-boiling liquid (51–52° C. at 11 mm. Hg) the concentration of the lactone in the atmosphere of the reaction vessel is preferably increased by use of subatmospheric pressures, by applying heat, or both. Another technique is to pass a stream of warm air, steam, inert gas, or the vapor of an inert organic solvent, such as those referred to above for dissolving beta-propiolactone, through a pool of the lactone and contacting the lactone-containing gas stream with the sample of wool under treatment.

After the reaction of the wool with beta-propiolactone and water has been carried out, the chemically modified wool is mechanically treated as by wringing, centrifuging, or the like to remove excess reagent. Any residual beta-propiolactone is then removed by washing with an inert organic solvent which may be of the same nature as those specified above for use in dissolving the lactone reagent. In many cases it is advisable to also wash the modified wool with an aqueous solution of a weak or moderately alkaline material to remove any beta-propionic acid or other materials formed by hydrolysis of the beta-propiolactone. As the alkaline material, sodium bicarbonate is preferred although one may use similar materials such as potassium bicarbonate, ammonium hydroxide, sodium carbonate, potassium bicarbonate, borax, and so forth. If an alkaline wash is used, it is preferable to then wash excess alkaline material from the wool with water.

With regard to the chemical reactions which take place in carrying out the process of this invention, it has been determined that the wool actually combines with the beta-propiolactone without destroying the polypeptide chains which make up the wool molecule. The beta-propiolactone attaches to various radicals such as amino, imino, hydroxyl, and carboxyl without altering the chain structure of the basic wool molecule. Thus in the reaction, free hydroxyl groups of the wool molecule are etherified by the —OCH$_2$—CH$_2$—COOH group; free amino and imino groups are amidified by the $$-CO-CH_2-CH_2-OH$$

group; and free carboxyl groups are esterified by the —OCH$_2$—CH$_2$—COOH group. Further details of the chemical reactions which occur are set forth in the Jones and Lundgren patent, No. 2,517,573.

The reaction of beta-propiolactone and water with wool does not alter the physical form of the wool fibers except to increase somewhat the diameter of the fibers—the modified fibers thus can be used for preparing any sort of product such as yarns, textiles, felts and so forth. In general it has been observed that when sufficient beta-propiolactone has reacted with wool to reduce its total nitrogen content to about 12%, the diameter of the fibers is increased by about 30%. Obviously, a greater uptake of lactone will yield a greater increase in fiber diameter and vice versa. X-ray studies have shown that the scale structure of wool fibers is retained in the modified wool so that the process is not merely a surface modification but involves actual chemical change of the fiber itself.

The process of this invention may be applied to any type of wool whether obtained from sheep, goats, or other fleece-bearing animals. The process may be applied to wool in the fiber form or in any of the forms into which it may be processed as for example yarn, knitted goods, woven goods, felts, scrap from carding, spinning, weaving and cutting operations, and so forth. In the preparation of felts, it is usually preferable to apply the propiolactone reaction to the wool fibers and then subject the modified fibers to the felting operations to form the felt.

With regard to the changes in properties due to the chemical modification in accordance with this invention, the most significant change is the increase in felting properties. Thus felts prepared from the chemically modified wool have a greater tensile strength than felts produced from the natural wool; further, the modified wool forms felts more rapidly than does natural wool. Also the chemically modified wool is softer and whiter than the natural fiber; it also acquires a sheen and loses some of its natural kinkiness. Another important point is that the surface conductivity of the chemically modified wool is much greater than that of natural wool. This means that the modified fiber can be mechanically processed, for example carded, spun, woven, knitted, etc. at a lower relative humidity than required in the mechanical processing of natural wool without building up deleterious electrostatic charges.

The following examples illustrate the invention in greater detail.

EXAMPLE I

A series of experiments were carried out to demonstrate the effect of various proportions of water on the reaction between wool and beta-propiolactone.

In each of these experiments, 10 ml. of beta-propiolactone was mixed with 40 ml. of carbon tetrachloride and a definite proportion of water (as hereinafter indicated) was added thereto, the mixture being allowed to stand 3 hrs. at 25° C. Then a 0.9 gram sample of dry wool was added to the lactone-carbon tetrachloride-water mixture and allowed to stand therein for 21 hours at 25° C. After this period of time, the modified wool was removed, washed with carbon tetrachloride, then water and dried at 105° C. The uptake of beta-propiolactone was calculated by the increase in weight of the wool sample.

In a control experiment, the process as above was carried out except that no water was added, thus the reaction was carried out under anhydrous conditions.

The results obtained are summarized in the following table:

Table 1.—Effect of varying proportion of water. Reaction at 25° C. for 21 hours

| Experiment | Water present, percent, based on dry wool | Uptake of beta-propiolactone, percent, based on dry wool |
| --- | --- | --- |
| Control | 0 | 0 |
| 1 | 5.6 | 0 |
| 2 | 10.7 | 0.2 |
| 3 | 13.2 | 4.0 |
| 4 | 15.7 | 5.4 |
| 5 | 19.6 | 11.7 |
| 6 | 21.9 | 42.4 |
| 7 | 23.2 | 54.0 |
| 8 | 28.1 | 75.0 |
| 9 | 65.5 | 76.2 |
| 10 | 109.5 | 76.8 |
| 11 | 220 | 75.4 |
| 12 | 560 | 63.6 |

EXAMPLE II (a) A 1-gram sample of wool which had been stored in the open and which had a moisture content of 12.5% was immersed in a mixture of 10 ml. beta-propiolactone and 40 ml. carbon tetrachloride and allowed to stand therein at room temperature for 40 hours. The wool was then removed, drained, washed and dried. The uptake of beta-propiolactone was found to be 11%.

(b) A control experiment conducted for the same time and under the same conditions but in which the wool was first dried showed no measurable uptake of beta-propiolactone.

(c) Other samples of wool containing 12.5% moisture were treated as set forth in part (a), employing different times of reaction. It was determined that with a reaction time of 20 hours the uptake of beta-propiolactone was 4%, at 80 hours the uptake was 27% and at 160 hours the uptake was 146%.

EXAMPLE III

A series of experiments were carried out to demonstrate the effect of varying time on the reaction between wool and beta-propiolactone at a constant proportion of water (33% based on the dry wool).

In each of these experiments 10 ml. of beta-propiolactone was mixed with 40 ml. of carbon tetrachloride and 300 mg. water. This mixture was allowed to stand 3 hours at 25° C., then a 0.9 gram sample of dry wool was added to the mixture and allowed to stand therein at 25° C. for a prescribed period of time, as hereafter indicated. The modified wool was washed and the uptake of beta-propiolactone determined as in Example I. Three series of experiments were conducted, one with Columbia wool, one with Lincoln wool, and one with mohair.

The results are summarized in the following table:

Table 2.—Effect of varying time on uptake of beta-propiolactone-reaction at 25° C., proportion of water 33%

| Sample | Time, hrs. | Uptake of beta-propiolactone, percent, based on dry wool |
| --- | --- | --- |
| Columbia | 3 | 11.2 |
| Do | 6 | 15.5 |
| Do | 16.7 | 54 |
| Do | 25 | 81 |
| Do | 28 | 94 |
| Do | 40.7 | 126 |
| Do | 73.3 | 208 |
| Do | 112.7 | 295 |
| Lincoln | 3 | 12.2 |
| Do | 5.5 | 22.9 |
| Do | 15.5 | 56 |
| Do | 22 | 77.8 |
| Do | 40 | 137 |
| Mohair | 2.3 | 8.7 |
| Do | 5 | 19.5 |
| Do | 18 | 68.4 |
| Do | 26.5 | 93 |
| Do | 42 | 127.4 |
| Do | 67 | 202 |

Having thus described our invention, we claim:

1. A process for chemically modifying wool comprising reacting wool with beta-propiolactone and water, the proportion of water being at least about 10%, based upon the weight of dry wool.

2. A process for chemically modifying wool comprising reacting wool with beta-propiolactone and water, the proportion of water being at least about 25%, based on the weight of dry wool.

3. The process of claim 2 wherein the water is initially mixed with the beta-propiolactone and the wool then contacted with his mixture containing beta-propiolactone hydrolysis products.

HAROLD P. LUNDGREN.
WILLIAM GORDON ROSE.
HARRISON WALTER JONES.

References Cited in the file of this patent

UNITED STATES PATENTS

| Number | Name | Date |
|---|---|---|
| 1,685,168 | Martin | Sept. 25, 1928 |
| 2,517,573 | Jones et al. | Aug. 8, 1950 |

FOREIGN PATENTS

| Number | Country | Date |
|---|---|---|
| 249,942 | Germany | Aug. 2, 1912 |

OTHER REFERENCES

Fearnley et al.: "The Action of $\beta$-Propiolactone on Wool," J. Soc. Dyers and Colourists, vol. 68, March 1952, pages 88–91.

Beilstein: "Handbuch der Organischen Chemie," 4th ed., Erstes Erganzungswerk, vol. 17, page 130, entry "Propiolacton."